(12) United States Patent
Rotstein et al.

(10) Patent No.: US 10,102,188 B2
(45) Date of Patent: Oct. 16, 2018

(54) ODATADOC GENERATION FROM ODATA METADATA DOCUMENT

(71) Applicant: SAP SE, Walldorf (DE)

(72) Inventors: Meir Rotstein, Bruchin (IL); Raja Nasrallah, Shfaram (IL)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 14/799,217

(22) Filed: Jul. 14, 2015

(65) Prior Publication Data

US 2017/0017623 A1    Jan. 19, 2017

(51) Int. Cl.
| | | |
|---|---|---|
| G06F 17/00 | (2006.01) | |
| G06F 17/22 | (2006.01) | |
| G06F 17/27 | (2006.01) | |
| G06F 8/41 | (2018.01) | |
| G06F 8/20 | (2018.01) | |
| G06F 17/30 | (2006.01) | |
| G06F 17/24 | (2006.01) | |
| G06F 8/30 | (2018.01) | |

(52) U.S. Cl.
CPC .......... G06F 17/2247 (2013.01); G06F 8/427 (2013.01); G06F 17/272 (2013.01); G06F 8/20 (2013.01); G06F 8/30 (2013.01); G06F 17/24 (2013.01); G06F 17/3089 (2013.01); G06F 17/30893 (2013.01); G06F 17/30896 (2013.01); G06F 17/30905 (2013.01)

(58) Field of Classification Search
CPC .......... G06F 17/2247; G06F 17/30896; G06F 17/3089; G06F 17/30905; G06F 17/30893; G06F 17/24; G06F 8/30
See application file for complete search history.

(56) References Cited

U.S. PATENT DOCUMENTS

| | | | |
|---|---|---|---|
| 7,577,907 B2 | 8/2009 | Vishnia-shabtai et al. | |
| 8,572,157 B2 | 10/2013 | Bouw et al. | |
| 8,713,368 B2 | 4/2014 | Lock | |
| 2009/0083297 A1* | 3/2009 | Pohl | G06F 17/2247 |
| 2012/0109937 A1 | 5/2012 | Liensberger et al. | |
| 2012/0158655 A1* | 6/2012 | Dove | G06F 17/30587 707/627 |
| 2012/0246334 A1 | 9/2012 | Yang et al. | |
| 2014/0181322 A1 | 6/2014 | Schmitt et al. | |
| 2015/0012561 A1 | 1/2015 | Kirchoff | |

OTHER PUBLICATIONS

Thoma et al. "REST-based sensor networks with OData" Published Mar. 2014 pp. 33-40 by IEEE.*
Thoma et al., "REST-based sensor networks with OData"—Published 03/214 pp. 33-40 by IEEE.*

* cited by examiner

*Primary Examiner* — Quoc A Tran

(74) *Attorney, Agent, or Firm* — Fish & Richardson P.C.

(57) ABSTRACT

Implementations of the present disclosure include methods, systems, and computer-readable storage mediums for receiving a common schema definition language (CSDL) document that describes an Internet-accessible service, processing the CSDL document through a CSDL parser to provide a CSDL object document, processing the CSDL object document through a text document generator to provide a human-readable text document, and transmitting the human-readable text document for display to a user.

20 Claims, 8 Drawing Sheets

```
<?xml version="1.0" encoding="utf-8" ?>
<edmx:Edmx
    xmlns:edmx="http://schemas.microsoft.com/ado/2007/06/edmx">
  <edmx:DataServices
      xmlns:m="http://schemas.microsoft.com/ado/2007/08/dataservices/m
      etadata" m:DataServiceVersion="3.0">
    <Schema
        xmlns:cg="http://schemas.microsoft.com/ado/2008/04/codegeneration"
        xmlns:sap="http://www.sap.com/Protocols/SAPData"
        xmlns:rdl="https://www.sap.com/Protocols/SAPData/RDL"
        xmlns="http://schemas.microsoft.com/ado/2008/11/edm"
        xmlns:m="http://schemas.microsoft.com/ado/2007/08/dataservices/m
        etadata"
        xmlns:d="http://schemas.microsoft.com/ado/2007/08/dataservices"
        Namespace="test">
      <ComplexType Name="MyType">
        <Property Name="inte" Type="Edm.Int64" />
        <Property Name="str" Type="Edm.String" MaxLength="5000" Unicode="true" />
      </ComplexType>
      <EntityType Name="EN_entityType">
        <Key>
          <PropertyRef Name="el" />
        </Key>
        <Property Name="el" Type="Edm.Int64" Nullable="false" />
        <Property Name="el2" Type="Edm.Int64" />
        <Property Name="tt" Type="test.MyType" />
        <Property Name="dt" Type="Edm.DateTimeOffset" sap:Type="LocalDate" />
        <Property Name="tn" Type="Edm.Time" sap:Type="LocalTime" />
        <NavigationProperty Name="ass" Relationship="EN_ass_EN2"
            FromRole="EN_entityType" ToRole="EN2_entityType" />
      </EntityType>
      <EntityType Name="EN2_entityType">
        <Key>
          <PropertyRef Name="el" />
        </Key>
        <PropertyRef Name="el" />
        </Key>
        <Property Name="el" Type="Edm.Int64" Nullable="false" />
      </EntityType>
      <Association Name="EN_ass_EN2">
        <End Role="EN" Type="test.EN_entityType" Multiplicity="1" />
        <End Role="EN2" Type="EN2_entityType" Multiplicity="0..1" />
      </Association>
      <EntityContainer Name="test" m:IsDefaultEntityContainer="true">
        <EntitySet Name="EN" EntityType="test.EN_entityType" />
        <FunctionImport Name="ac1" IsSideEffecting="true" IsBindable="true" rdl:source-
            object="action">
          <ReturnType Type="Edm.Int64" />
          <Parameter Name="bindingParam" Type="test.EN_entityType" />
          <Parameter Name="s" Mode="In" Type="Edm.String" />
          <Parameter Name="n" Mode="In" Type="Edm.Int64" />
        </FunctionImport>
        <FunctionImport Name="getDateTime" IsSideEffecting="true" IsBindable="true"
            rdl:source-object="action">
          <ReturnType Type="Edm.DateTimeOffset" sap:Type="LocalDate" />
          <Parameter Name="bindingParam" Type="test.EN_entityType" />
          <Parameter Name="s" Mode="In" Type="Edm.DateTimeOffset" />
          <Parameter Name="n" Mode="In" Type="Edm.Time" sap:Type="LocalTime" />
        </FunctionImport>
        <AssociationSet Name="EN_ass_EN2" Association="test.EN_ass_EN2">
          <End Role="EN_entityType" EntitySet="EN" />
          <End Role="EN2_entityType" EntitySet="EN2" />
        </AssociationSet>
        <EntitySet Name="EN2" EntityType="test.EN2_entityType" />
      </EntityContainer>
    </Schema>
    <Schema
        xmlns:cg="http://schemas.microsoft.com/ado/2008/04/codegeneration"
        xmlns:sap="http://www.sap.com/Protocols/SAPData"
        xmlns:rdl="https://www.sap.com/Protocols/SAPData/RDL"
        xmlns="http://schemas.microsoft.com/ado/2008/11/edm"
        xmlns:m="http://schemas.microsoft.com/ado/2007/08/dataservices/m
        etadata"
        xmlns:d="http://schemas.microsoft.com/ado/2007/08/dataservices"
        Namespace="test.dev">
      <EntityType Name="EN_2_entityType">
        <Key>
        <Property Name="boo" Type="Edm.Int64" />
        <Property Name="_ID" Type="Edm.Int64" Nullable="false" />
      </EntityType>
      <EntityContainer Name="test.dev" m:IsDefaultEntityContainer="false">
        <EntitySet Name="EN_2" EntityType="test.dev.EN_2_entityType" />
      </EntityContainer>
    </Schema>
  </edmx:DataServices>
</edmx:Edmx>
```

*FIG. 3*

Quick Navigation
test
  test EN
  test EN2
  test dev EN 2
Namespace test
Read Namespace
Returns a list of entities defined in the namespace 'test'
| | |
|---|---|
| URL | http://b215614:8001/sap/hana/rdl/odata/v1/lib/test |
| Method | GET |
| Request Body | None |
| Response Body | { "d": { "EntitySets": [ "test.EN", "test.EN2", "test.dev.EN_2" ] } } |

Read Namespace Metadata
Returns an XML representation of the RDL objects defined within the namespace 'test'
| | |
|---|---|
| URL | http://b215614:8001/sap/hana/rdl/odata/v1/lib/test/$metadata |
| Method | GET |
| Request Body | None |
| Response Body | `<?xml version="1.0" encoding="utf-8"?><edmx:Edmx xmlns:edmx="http://schemas.microsoft.com/ado/2007/06/edmx"> <edmx:DataServices xmlns:m="http://schemas.microsoft.com/ado/2007/08/dataservices/metadata" m:DataServiceVersion="3.0"> <Schema xmlns:cg="http://schemas.microsoft.com/ado/2006/04/codegeneration" xmlns:sap="http://www.sap.com/Protocols/SAPData" xmlns:rdl="http://www.sap.com/Protocols/SAPData/RDL" xmlns="http://schemas.microsoft.com/ado/2009/11/edm" xmlns:m="http://schemas.microsoft.com/ado/2007/08/dataservices/metadata" xmlns:d="http://schemas.microsoft.com/ado/2007/08/dataservices" Namespace="test"> <ComplexType Name="MyType"> <Property Name="iste" Type="Edm.Int64"/> <Property Name="str" Type="Edm.String" MaxLength="5000" Unicode="true"/> </ComplexType> <EntityType Name="EN_entityType"> <Key> <PropertyRef Name="el"/> </Key> <Property Name="el" Type="Edm.Int64" Nullable="false"/> <Property Name="el2" Type="Edm.Int64"/> <Property Name="n" Type="test.MyType"/> <Property Name="dt" Type="Edm.DateTimeOffset" sap:Type="LocalDate"/> <Property Name="tn" Type="Edm.Time" sap:Type="LocalTime"/> <NavigationProperty Name="ass" Relationship="EN_ass_EN2" FromRole="EN_entityType" ToRole="EN2_entityType"/> </EntityType> <EntityType Name="EN2_entityType"> <Key> <PropertyRef Name="el"/> </Key> <Property Name="el" Type="Edm.Int64" Nullable="false"/> </EntityType> <Association Name="EN_ass_EN2"> <End Role="EN" Type="test.EN_entityType" Multiplicity="1"/> <End Role="EN2" Type="EN2_entityType" Multiplicity="0..1"/> </Association> <EntityContainer Name="test" m:IsDefaultEntityContainer="true"> <EntitySet Name="EN" EntityType="test.EN_entityType"/> <FunctionImport Name="ac1" IsSideEffecting="true" IsBindable="true" rdl:source-object="action"> <ReturnType Type="Edm.Int64"/> </FunctionImport> <FunctionImport Name="getDateTime" IsSideEffecting="true" IsBindable="true" rdl:source-object="action"> <Return...` |

FIG. 4A

```
          Method: PUT
          Request Body: { "boo": "<value>" }
          Response Body: 204 No Content
Delete Instance of 'test.dev.EN_2'
Delete an instance of of a 'test.dev.EN_2'
          URL: http://35614:8001/sap/hana/rdl/odata/v1/lib/test/test.dev.EN_2_ID=<value>
          Method: DELETE
          Request Body: None
          Response Body: 204 No Content
```

Entity Element

```
Read Instance Element 'boo'                              (back to test.dev.EN_2)
Returns a specific element of a specific instance of a 'test.dev.EN_2'. The URL contains the key of the instance to return, as
well as the name of the element
          URL: http://35614:8001/sap/hana/rdl/odata/v1/lib/test/test.dev.EN_2_ID=<value>/boo
          Method: GET
          Request Body: None
          Response Body: { "d": { "boo": "<value>" } }
Update Instance Element 'boo'
Updates a specific primitive element of an instance of 'test.dev.EN_2'.
          URL: http://35614:8001/sap/hana/rdl/odata/v1/lib/test/test.dev.EN_2_ID=<value>/boo
          Method: PUT
          Request Body: { "boo": "<value>" }
          Response Body: 204 No Content
Read Element Value 'boo'
Returns the value of a specific element of a 'test.dev.EN_2'. The URL contains the key of the instance to return, as well as
the name of the element.
          URL: http://35614:8001/sap/hana/rdl/odata/v1/lib/test/test.dev.EN_2_ID=<value>/boo/$value
          Method: GET
          Request Body: None
          Response Body: <value>
Read Instance Element '_ID'                              (back to test.dev.EN_2)
Returns a specific element of a specific instance of a 'test.dev.EN_2'. The URL contains the key of the instance to return, as
well as the name of the element
          URL: http://35614:8001/sap/hana/rdl/odata/v1/lib/test/test.dev.EN_2_ID=<value>/_ID
          Method: GET
          Request Body: None
          Response Body: { "d": { "_ID": "<value>" } }
Read Element Value '_ID'
Returns the value of a specific element of a 'test.dev.EN_2'. The URL contains the key of the instance to return, as well as
the name of the element.
          URL: http://35614:8001/sap/hana/rdl/odata/v1/lib/test/test.dev.EN_2_ID=<value>/_ID/$value
          Method: GET
          Request Body: None
          Response Body: <value>
```

*FIG. 4B*

ODATADOC GENERATION FROM ODATA METADATA DOCUMENT

BACKGROUND

Software developers develop applications that request and receive data from other applications. In some examples, an application can request data from another application through an application program interface (API). An API can be described as a set of routines, protocols, and tools, and expresses a software component in terms of its operations, inputs, outputs, and underlying types. An example API includes a web service API. In some examples, web service APIs that adhere to the representational state transfer (REST) architectural constraints are called RESTful APIs. The open data protocol (OData) is an OASIS standard that provides best practices for building and consuming RESTful APIs.

In developing an application that is to consume an OData-based API, the developer must learn about the application structure, entities, relationships, logic, etc. This information is required in order to understand the hypertext transfer protocol (HTTP) calls that should be used in terms of uniform resource locators (URLs), HTTP method, payload, expected response, and the like.

In order to provide this information, OData provides a constant URL (e.g., ~/$metadata), which returns an extensible markup language (XML) document that describes the entire application. In some examples, the XML document is provided as a common schema definition language (CSDL). The CSDL document, however, is complex and often difficult to understand (e.g., determining the actual HTTP calls expressed in the CSDL document can be very difficult). In order to understand the CSDL document, familiarity with CSDL as whole is needed, as well as with the OData concepts. This increase the application development learning curve, and increases the time it takes from the moment the application is released until the time it is fully consumed.

SUMMARY

Implementations of the present disclosure include computer-implemented methods for are generally directed to providing a human-readable text document (e.g., a hypertext markup language (HTML) document) based on a common schema definition language (CSDL) document. In some implementations, methods include actions of receiving a common schema definition language (CSDL) document that describes an Internet-accessible service, processing the CSDL document through a CSDL parser to provide a CSDL object document, processing the CSDL object document through a text document generator to provide a human-readable text document, and transmitting the human-readable text document for display to a user.

These and other implementations can each optionally include one or more of the following features: processing the CSDL document through a CSDL parser includes recursively processing tags and attributes of tags provided in the CSDL document to provide respective object models for one or more tags and populate the object models with respective attributes of the tags; processing the CSDL object document through a text document generator to provide a human-readable text document includes processing object models of the CSDL object document to provide respective descriptions; processing the CSDL object document through a text document generator to provide a human-readable text document further includes collating descriptions into the human-readable text document; the CSDL object document is a technical representation of the CSDL document, and is provided in a computer-executable computer-programming language; the human-readable text document is provided as a hypertext markup language (HTML) document; and the CSDL document is provided as an extensible markup language (XML) document.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts an example common schema definition language (CSDL) document.

FIGS. 4A and 4B depict respective portions of an example text document in accordance with implementations of the present disclosure.

Like reference symbols in the various drawings indicate like elements.

DETAILED DESCRIPTION

Implementations of the present disclosure are generally directed to providing a human-readable text document (e.g., hypertext markup language (HTML) document) based on a common schema definition language (CSDL) document. More particularly, implementations of the present disclosure are directed to parsing a CSDL document to provide a CSDL object, and processing the CSDL object using a generator of a plurality of generators to provide the HTML document. As described in further detail herein, implementations of the present disclosure simplify the consumption of open data protocol (OData) applications, and shorten the time and learning curve of consuming and developing over OData APIs. In this manner, the time-to-market of an application can be reduced.

Figure 1:
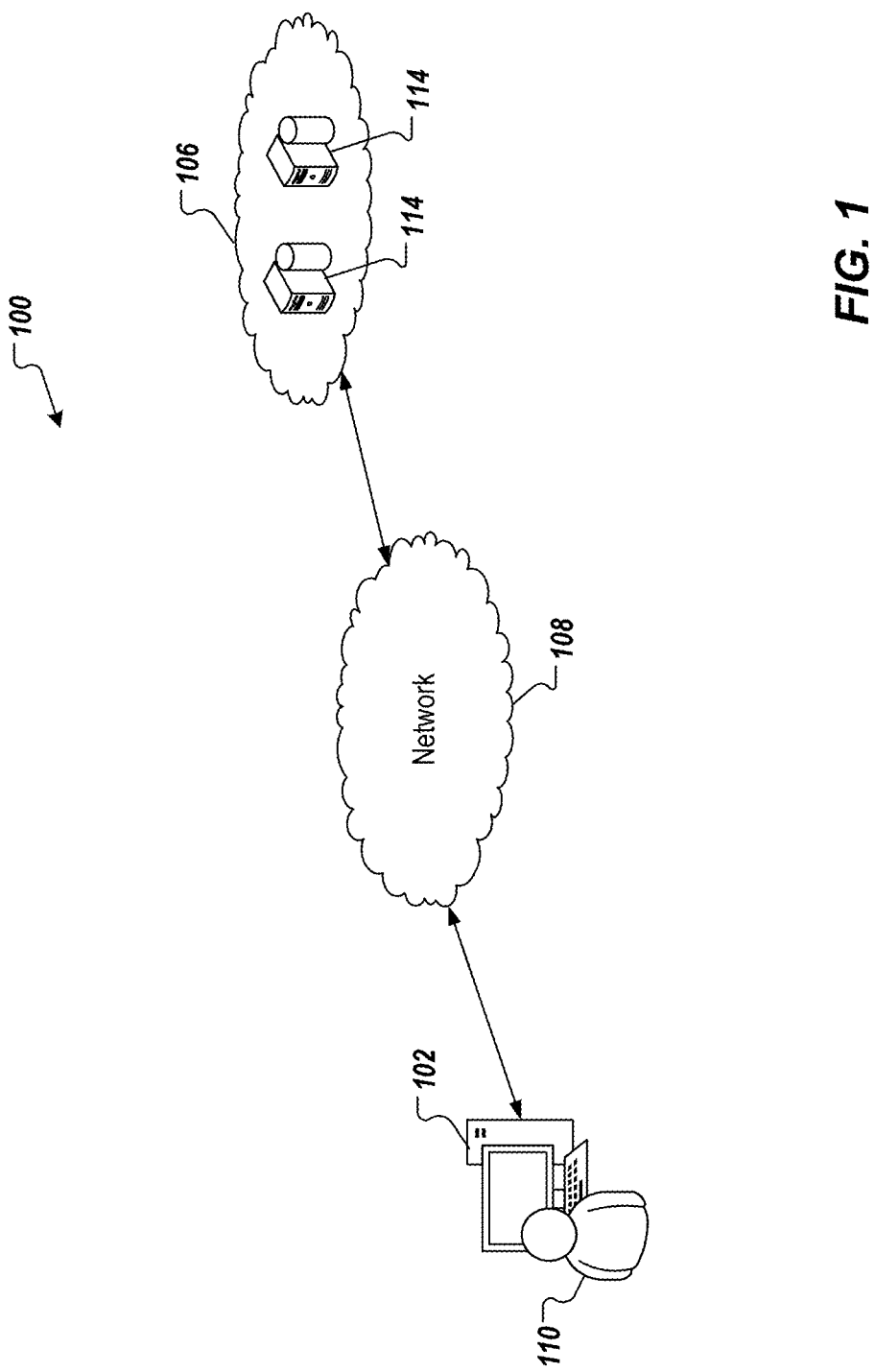
FIG. 1 depicts an example system in accordance with implementations of the present disclosure.

FIG. 1 depicts an example system 100 in accordance with implementations of the present disclosure. The example system 100 can be used to provide a human-readable HTML document based on a CSDL document as described herein. In the depicted example, the example system 100 includes a computing device 102, a back-end system 106, and a network 108. In some examples, the communication device 102 is operated by a user 110. An example user can include a tester that performs penetration testing on a target system. In the depicted example, the computing device 102 is provided as a desktop computer. It is contemplated, however, that implementations of the present disclosure can be realized with any appropriate computing device (e.g., smartphone, tablet computing device, laptop computer, desktop computer). In some examples, the network 108 includes a local area network (LAN), wide area network (WAN), the Internet, or a combination thereof, and connects web sites, user devices (e.g., the computing device 102), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 114. In some examples, the at least one server system 114 hosts one or more computer-implemented services that users can interact with using computing devices. For example, the computing device 102 can be used to communicate with a service hosted by the back-end system 106 over the network 108. In some examples, the computing device 102 includes a computer-executable application executed thereon, which can be used to log into the service and establish a communication session between the computing device 102 and the back-end system 106. For example, the computing device 102 includes a web browser application executed thereon, which can be used to display one or more web pages of the service, the user interacting with the service through the web page(s). In some examples, the computing device 102 can execute a mobile application (mobile app) to access the back-end system 106.

As introduced above, implementations of the present disclosure are generally directed to providing a human-readable text document (e.g., a HTML document) based on a CSDL document. More specifically, implementations of the present disclosure are directed to converting the CSDL document provided for an OData application to the human-readable text document (also referred to as an ODataDoc herein). In some examples, and as described in further detail herein, the ODataDoc provides a list of all available HTTP calls the respective application allows, including the URL, HTTP method, payload (for non-GET calls), expected response, HTTP parameters (if existing), and the like. In some examples, the ODataDoc can be either generated on-the-fly (e.g., in response to a request, or triggering event), or as static files stored in computer-readable memory.

Figure 2:
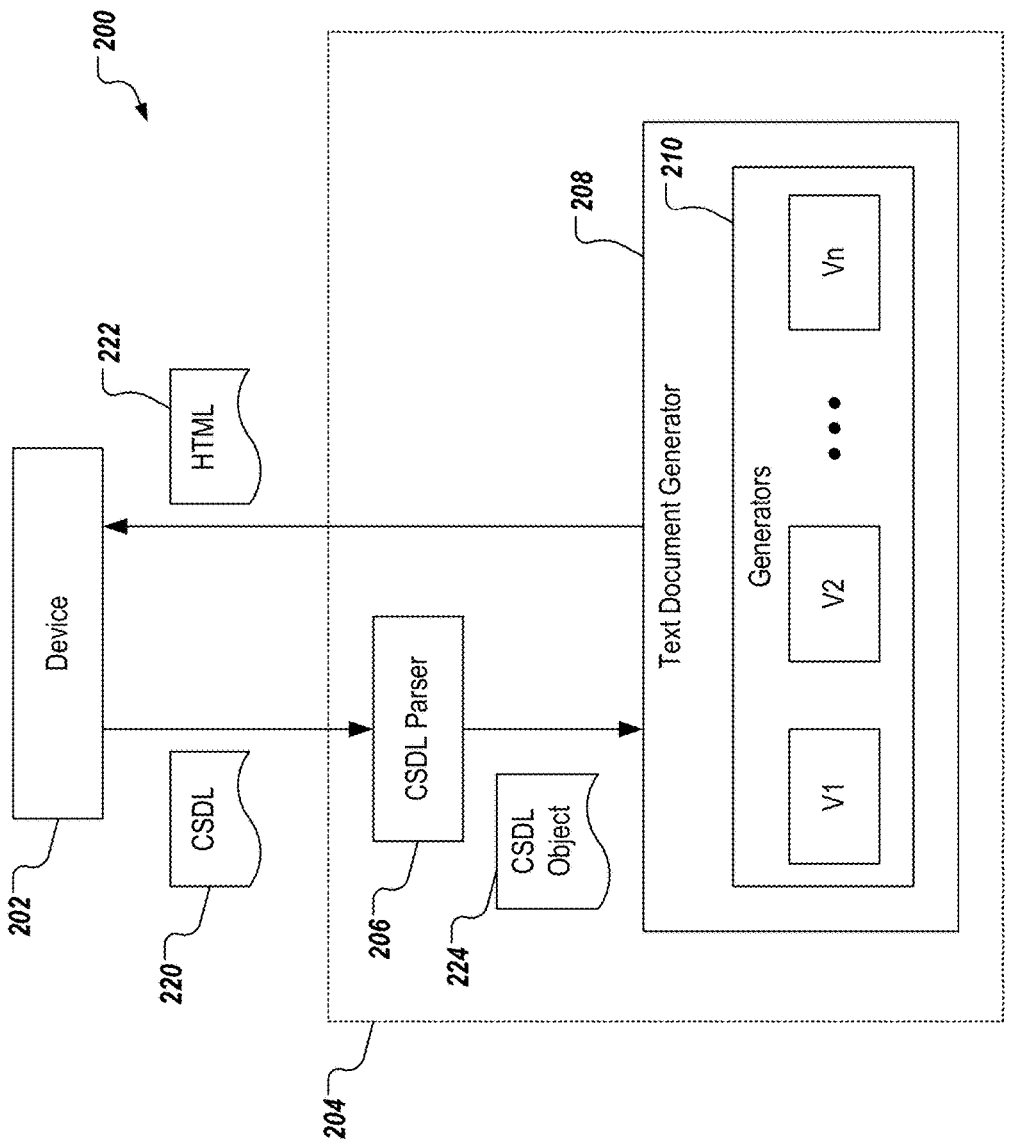
FIG. 2 depicts an example architecture for realizing implementations of the present disclosure.

FIG. 2 depicts an example architecture 200 for realizing implementations of the present disclosure. The example architecture 200 includes a device 202 that communicates with a text document generation system 204. In some examples, the text document generation system 204 is provided as one or more computer-executable programs executed by one or more computing devices. In the depicted example, the device 202 is separate from the text document generation system 204. For example, the device 202 can include a client device (e.g., the computing device 102 of FIG. 1), and the text document generation system 204 can be hosted on another computing device (e.g., the back-end system 106 of FIG. 1). In some examples, the text document generation system 204 can be executed by the device 202. In some implementations, the text document generation system 204 includes a CSDL parser 206 and a text document (ODataDoc) generator 208. In some examples, the text document generator 208 includes a plurality of generators 210, each generator corresponding to a respective version (e.g., V1, V2, . . . , Vn) of OData. In some implementations, the device 202 provides a CSDL document 220 to the text document generation system 204, which processes the CSDL document 220 to provide a text document 222 (e.g., HTML document) back to the device 202.

In some implementations, the CSDL parser 206 parses the CSDL document to provide a CSDL object document 224. In some examples, the CSDL object document 224 is a technical representation of the CSDL document, and can be provided in any appropriate development language (e.g., Java). At a high-level, the CSDL parser 206 translates the CSDL document 220, provided as an XML document, into the CSDL object document 224. In some implementations, the CSDL parser 206 parses the CSDL document 220 into memory, and reads the tags in hierarchical order. An example hierarchical order of tags can be provided as:

Schema
   ComplexType
      Property
   EnumType
      Member
   EntityType
      PropertyRef
      Property
      Navigation Property
   AssociationType
   EntityContainser
      EntitySet
      FunctionImport
      Association Set In some examples, the CSDL parser 206 starts from the schema tag (the top-level tag), and recursively reads lower-level tags, as described herein. In some implementations, for each tag, the CSDL parser 206 creates an object model that is suitable for the respective tag. For example, for a ComplexType tag, the CSDL parser 206 provides a ComplexType model object. For each tag, the CSDL parser 206 reads the tag's attributes, if any, and saves the attribute values in the object model. In some examples, if the attribute references another object model, the CSDL parser 206 determines whether the referenced object model is already saved as reference, and if not, the CSDL parser 206 creates an empty object model for the reference object, and saves the reference therein. In some examples, the resulting CSDL object document 224 provides a model of the underlying service (e.g., provided through the API), identifies entities, relationships between entities, and logic that can be executed, among other characteristics.

In some implementations, the text document generator 208 translates the CSDL object document 224 to the text document 222. In some examples, the text document can be opened by any appropriate web browser, and describes the service model, interfaces, etc. of the CSDL document 220 in a human-readable representation. In some implementations, the text document generator 208 receives the CSDL object document 224 from the CSDL parser 206. In some examples, a generator of the plurality of generators 210 is selected based on the OData version identified in the CSDL object document 224. In some examples, if there is no generator for the version, an error is displayed. In some implementations, the selected generator processes the schemas, entities and actions in the CSDL object document 224, and, for each, the generator provides a description of the available calls for creating, updating, deleting or executing. Example description features can be provided as:

URL: the URL for the call, provided as a generic or generated for the specific system.

Method: HTTP Method—GET, POST, PUT, DELETE, etc.

Request Body: expected structure of request body—can be either sample of XML or JSON.

Response Body: expected structure of response—can be either sample of XML or JSON.

In some implementations, the description is provided as a metadata description. Consequently, and in some examples, the description contains no data. Instead, and in some examples, data expressions are represented by a suitable token. For the data expression {d:22} can be represented as {d:<value>} or {d:<integer value>} in the description.

FIG. 3 depicts an example CSDL document 300. In some examples, the example CSDL document 300 is provided as an XML document including a hierarchical structure of tags. FIGS. 4A and 4B depict respective portions of an example text document 400 that can be provided based on the example CSDL document 300. The example text document 400 is provided as an HTML document. In some examples, the text document 400 can be displayed within a web browser executed by a computing device (e.g., the computing device 102 of FIG. 1). The example text document 400 includes a series of descriptions. For example, and with reference to FIG. 4A, a description 402 is provided, which includes the example description structure described above. For example, the description provides that "Read Namespace" is executed to "Return a list of entities defined in the namespace 'test'" and further provides:

URL: http://lu238614:8001/sap/hana/rdl/odata/v1/lib/test (the URL for the call)

Method: GET (the HTTP method)

Request Body: none

Response Body: {"d": {"EntitySets": ["test.EN", "test.EN2", "test.dev.EN_2" ] }} (indicating the response returned for the call)

Similar descriptions are provided throughout the remainder of the text document 400, portions of which are depicted in FIGS. 4A and 4B.

Figure 5:
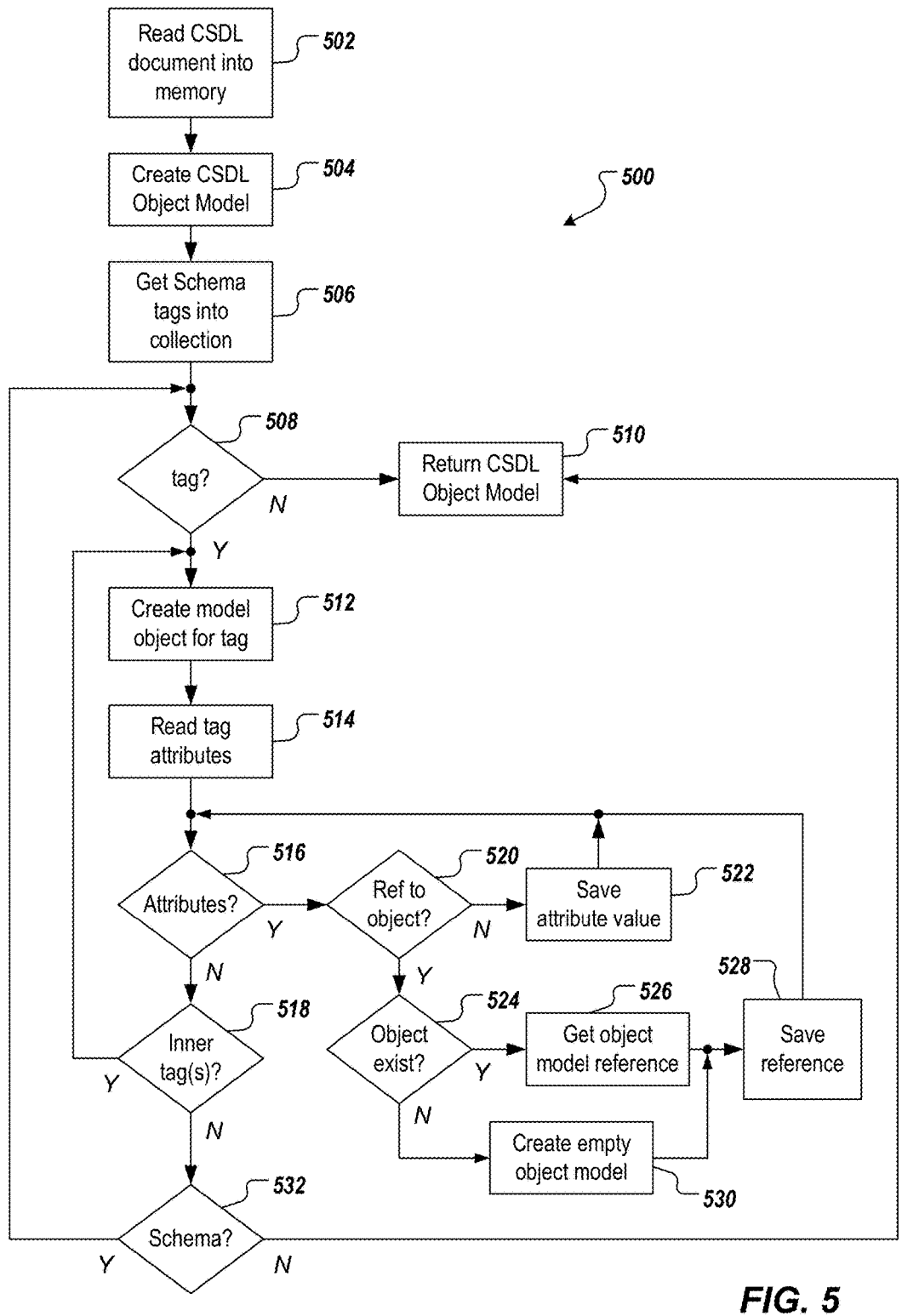
FIG. 5 depicts an example process that can be executed in accordance with implementations of the present disclosure.

FIG. 5 depicts an example process 500 that can be executed in accordance with implementations of the present disclosure. In some implementations, the example process 500 can be realized using one or more computer-executable programs executed using one or more computing devices. The example process 500 can be executed by the CSDL parser 206 to provide the CSDL object document 224, as described herein.

A CSDL document is read into memory (502). For example, the CSDL parser 206 receives the CSDL document 220 from the device 202 and stores the CSDL document 220 in computer-readable memory. A CSDL object document is created (504). For example, the CSDL parser 206 creates an empty CSDL object document in response to receiving the CSDL document. Schema tags of the CSDL document are provided in a set of schema tags (506). For example, the CSDL parser 206 reviews the documents and places tags (e.g., XML tags) that are present in the document into a set of tags. In some examples, the tags of the set of tags are provide in a hierarchical order (e.g., the example hierarchical order described above).

It is determined whether a tag in the set of tags remains to be processed (508). More specifically, and as described in further detail herein, the CSDL parser 206 processes the tags one at a time in the hierarchical order until all tags have been considered. If there are no additional tags left in the set of tags to be considered, the CSDL object document is returned (510). For example, the CSDL parser 206 provided the CSDL object 224 to a generator 210.

If there is a tag in the set of tags to be considered, a model object for the tag is created (512). For example, the CSDL parser 206 creates a model object for the tag within the CSDL object document. If the current tag is the first tag being considered, the corresponding model object is the first model object provided in the CSDL object document. The tag attributes are read (514). For example, the CSDL parser 206 reads the attributes of the currently considered tag. It is determined whether any attributes are provided (516). If no attribute is provided, or if all attributes have been considered, it is determined whether any inner tags for the currently considered tag are provided (518). If one or more attributes are provided, an attribute is selected and it is determined whether the attribute is a reference to another object (520). If the attribute is not a reference to another object, the value of the attribute is stored, and the example process loops back to consider any additional attributes.

If the attribute is a reference to another object, it is determined whether an object model for the referenced object exists (524). For example, the CSDL parser 206 can review a list of created object models. If an object model does exist for the referenced object, a reference to the object model is retrieved (526), and the reference is stored (528). In some examples, the reference is a unique identifier that uniquely identifies the object model among other object models. If an object model does not exist for the referenced object, an empty object model is created (530).

If all attributes have been considered, it is determined whether any inner tags for the currently considered tag are provided (518). If one or more inner tags are provided, the example process loops 500 loops back to provide an object model for each inner tag. If no inner tags are provided, or all inner tags have been considered, it is determined whether the currently considered tag (from (508)) is a schema tag (532). If the tag is not a schema tag, the example process 500 loops back. If the tag is not a schema tag, the CSDL object document is provided (510). Accordingly, and as described herein, the example process 500 processes all of the inner level tags returns to the top-level tag (schema tag), and determines whether there are any additional schema tags to be processed. If there are no additional schema tags to be processed, the object model is returned.

Figure 6:
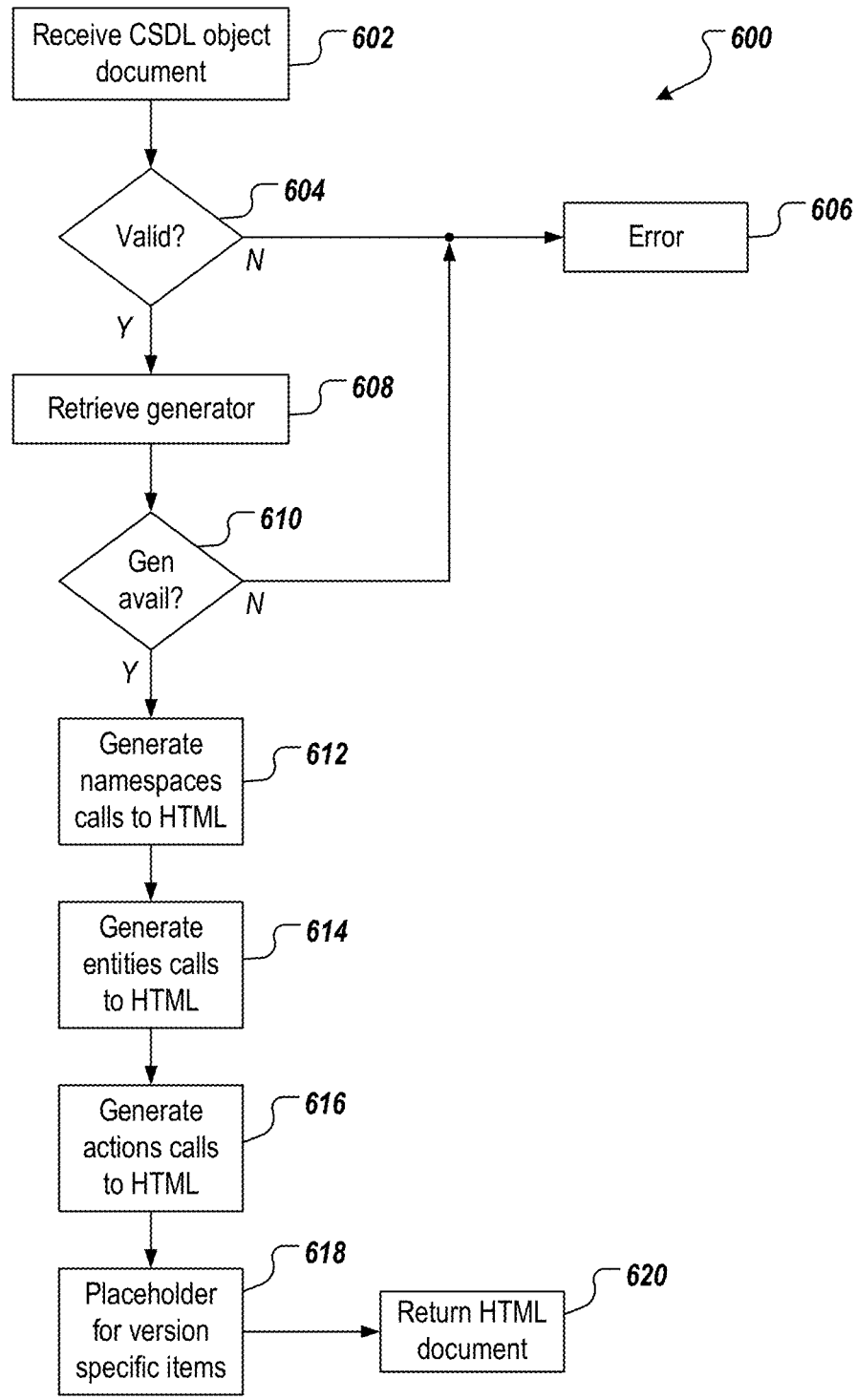
FIG. 6 depicts an example process that can be executed in accordance with implementations of the present disclosure.

FIG. 6 depicts an example process 600 that can be executed in accordance with implementations of the present disclosure. In some implementations, the example process 600 can be realized using one or more computer-executable programs executed using one or more computing devices. The example process 600 can be executed by the text document generator 208 to provide the text document 222, as described herein.

A CSDL object document is received (602). For example, the text document generator 208 receives the CSDL object document from the CSDL parser 206. It is determined whether the CSDL object document is valid (604). NOTE TO INVENTORS: What does it mean for the CSDL object document to be valid, and how is this determined? If the CSDL object document is not valid, an error is displayed (606) and the example process 600 stops.

If the CSDL document is valid, a generator is selected (608). For example, the text document generator 208 attempts to select a generator 210 form the plurality of generators based on the OData version of the CSDL document. It is determined whether a generator is available (610). If a generator is not available, an error is displayed (606) and the example process 600 stops. If a generator is available, the generator is selected and is used to generate namespace calls to HTML (612), to generate entity calls to HTML (614), and to generate action calls to HTML (616). In some examples, OData enables specific APIs to be exposed to run respective logic for the application, where an API is exposed by an action. In some examples, execution of an action depends on the particular characteristics of the action. For example, an action that has a side effect (e.g., a non-read only action) will run with a HTTP POST command. As another example, an action that does not have a side effect (e.g., a read only action, or function) will run with a HTTP GET command. As another example, an action that is bounded to specific entity instance will be invoked on the following example form: ~/service/entity('key')/action-Name. As another example, an action that is not bounded to specific entity instance (e.g., a global action) will be invoked on the following example form: ~/service/actionName. The CSDL document provides this information for the respective actions.

A placeholder for version-specific items is provided (618). In some examples, version-specific items are features that are presented in a certain service and not in others, typically part of newer versions. For example, a relationship between services (cross CSDL) are available from OData v4 and on, but are not part of older versions. The resulting HTML document is returned (630). For example, the text document generator 208 sends the HTML document 222 to the device 202.

Figure 7:
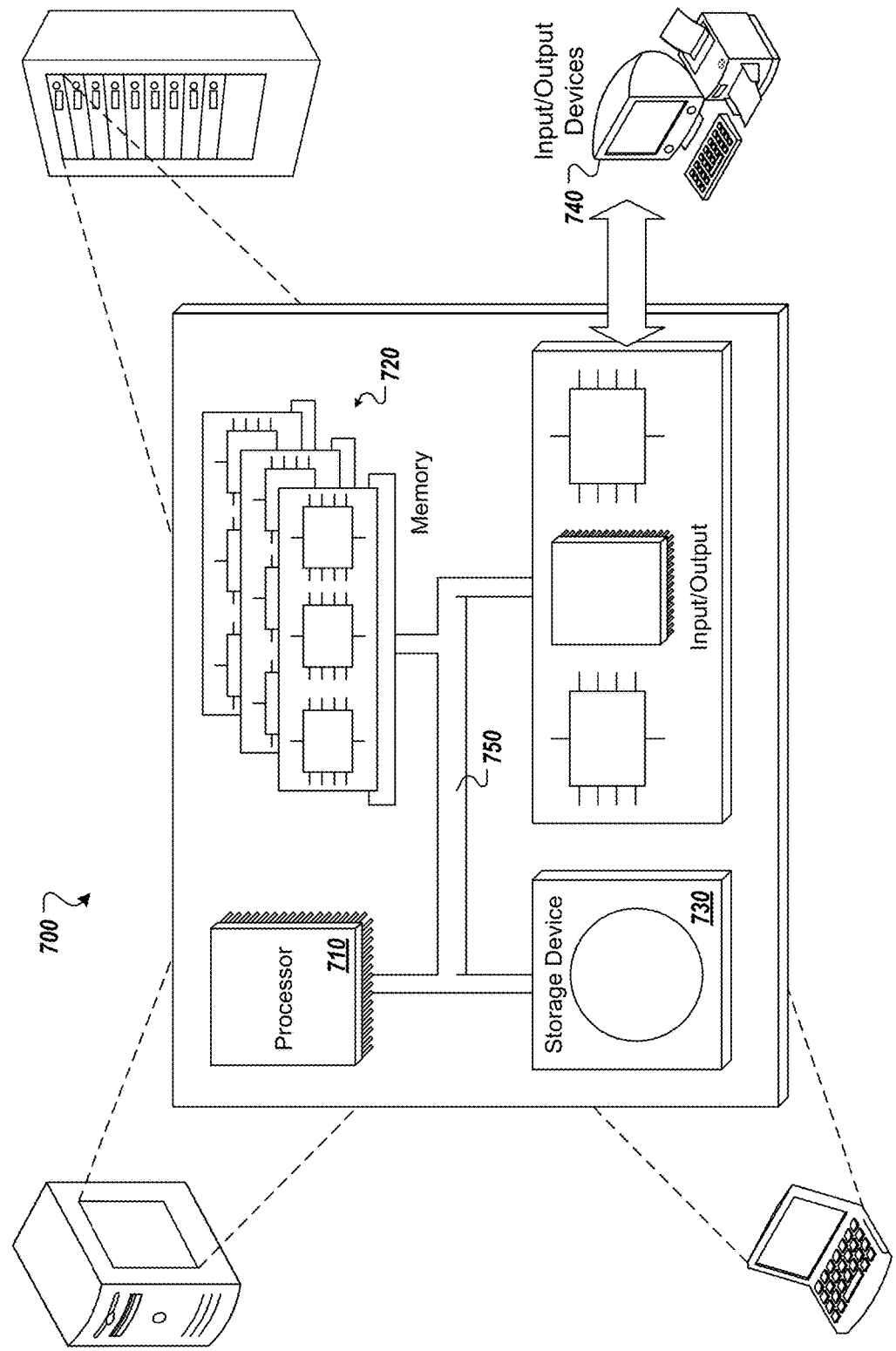
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   receiving a common schema definition language (CSDL) document that comprises a complex description of an Internet-accessible service, the CSDL document comprising a hierarchical structure of tags and attributes of tags;
   processing the CSDL document through a CSDL parser to read the tags in a hierarchical order starting from a schema tag defining a top-level tag and recursively reading lower-level tags comprising at a first lower level schema types and at a second lower level attributes corresponding to each of the schema types to provide a CSDL object document that provides a model of the Internet-accessible service;
   processing, by the one or more processors, the CSDL object document through a text document generator to provide a human-readable text document, the human-readable text document comprising a simplified description of the Internet-accessible service to reduce a time-to-market of the Internet-accessible service; and
   transmitting, by the one or more processors, the human-readable text document for display to a user.

2. The method of claim 1, wherein processing the CSDL document through a CSDL parser comprises recursively processing tags and attributes of tags provided in the CSDL document to provide respective object models for one or more tags and populate the object models with respective attributes of the tags.

3. The method of claim 1, wherein processing the CSDL object document through a text document generator to provide a human-readable text document comprises processing object models of the CSDL object document to provide respective descriptions.

4. The method of claim 3, wherein processing the CSDL object document through a text document generator to provide a human-readable text document further comprises collecting descriptions into the human-readable text document.

5. The method of claim 1, wherein the CSDL object document is a technical representation of the CSDL document, and is provided in a computer-executable computer-programming language.

6. The method of claim 1, wherein the human-readable text document is provided as a hypertext markup language (HTML) document.

7. The method of claim 1, wherein the CSDL document is provided as an extensible markup language (XML) document.

8. A non-transitory computer-readable storage medium coupled to one or more processors and having instructions stored thereon which, when executed by the one or more processors, cause the one or more processors to perform operations comprising:
   receiving a common schema definition language (CSDL) document that comprises a complex description of an Internet-accessible service, the CSDL document comprising a hierarchical structure of tags and attributes of tags;
   processing the CSDL document through a CSDL parser to read the tags in a hierarchical order starting from a schema tag defining a top-level tag and recursively reading lower-level tags comprising at a first lower level schema types and at a second lower level attributes corresponding to each of the schema types to provide a CSDL object document that provides a model of the Internet-accessible service;
   processing the CSDL object document through a text document generator to provide a human-readable text document, the human-readable text document comprising a simplified description of the Internet-accessible service to reduce a time-to-market of the Internet-accessible service; and
   transmitting the human-readable text document for display to a user.

9. The non-transitory computer-readable storage medium of claim 8, wherein processing the CSDL document through a CSDL parser comprises recursively processing tags and attributes of tags provided in the CSDL document to provide respective object models for one or more tags and populate the object models with respective attributes of the tags.

10. The non-transitory computer-readable storage medium of claim 8, wherein processing the CSDL object document through a text document generator to provide a human-readable text document comprises processing object models of the CSDL object document to provide respective descriptions.

11. The non-transitory computer-readable storage medium of claim 10, wherein processing the CSDL object document through a text document generator to provide a human-readable text document further comprises collecting descriptions into the human-readable text document.

12. The non-transitory computer-readable storage medium of claim 8, wherein the CSDL object document is a technical representation of the CSDL document, and is provided in a computer-executable computer-programming language.

13. The non-transitory computer-readable storage medium of claim 8, wherein the human-readable text document is provided as a hypertext markup language (HTML) document.

14. The non-transitory computer-readable storage medium of claim 8, wherein the CSDL document is provided as an extensible markup language (XML) document.

15. A system, comprising:
   a computing device; and
   a computer-readable storage device coupled to the computing device and having instructions stored thereon which, when executed by the computing device, cause the computing device to perform operations comprising:
      receiving a common schema definition language (CSDL) document that comprises a complex description of an Internet-accessible service, the CSDL document comprising a hierarchical structure of tags and attributes of tags;

processing the CSDL document through a CSDL parser to read the tags in a hierarchical order starting from a schema tag defining a top-level tag and recursively reading lower-level tags comprising at a first lower level schema types and at a second lower level attributes corresponding to each of the schema types to provide a CSDL object document that provides a model of the Internet-accessible service;

processing the CSDL object document through a text document generator to provide a human-readable text document, the human-readable text document comprising a simplified description of the Internet-accessible service to reduce a time-to-market of the Internet-accessible service; and transmitting the human-readable text document for display to a user.

16. The system of claim 15, wherein processing the CSDL document through a CSDL parser comprises recursively processing tags and attributes of tags provided in the CSDL document to provide respective object models for one or more tags and populate the object models with respective attributes of the tags.

17. The system of claim 15, wherein processing the CSDL object document through a text document generator to provide a human-readable text document comprises processing object models of the CSDL object document to provide respective descriptions.

18. The system of claim 17, wherein processing the CSDL object document through a text document generator to provide a human-readable text document further comprises collecting descriptions into the human-readable text document.

19. The system of claim 15, wherein the CSDL object document is a technical representation of the CSDL document, and is provided in a computer-executable computer-programming language.

20. The system of claim 15, wherein the human-readable text document is provided as a hypertext markup language (HTML) document.

* * * * *